United States Patent

Bentley et al.

[11] Patent Number: 5,838,236
[45] Date of Patent: Nov. 17, 1998

[54] MANUFACTURING METHOD AND APPARATUS

[75] Inventors: Stanley L. Bentley, Indianapolis; Gene R. Carey, Oaklandon; Patrick A. Heinzman, Cicero; Julie E. Myers, Indianapolis, all of Ind.

[73] Assignee: Diversified Systems Incorporated, Indianapolis, Ind.

[21] Appl. No.: 863,744

[22] Filed: May 27, 1997

[51] Int. Cl.⁶ .................................................. G08G 13/14
[52] U.S. Cl. .................... 340/572; 340/505; 340/825.49; 342/44; 455/88; 364/188; 364/146
[58] Field of Search .................................... 340/572, 568, 340/570, 571, 988, 505, 825.49, 539, 825.54, 825.31, 825.34, 825.35; 364/188–193, 146, 147, 474.22–474.27, 403, 478.01, 479.01; 395/155–167; 455/73, 88, 89; 342/42, 44, 51; 235/385

[56] References Cited

U.S. PATENT DOCUMENTS

| | | | |
|---|---|---|---|
| 3,618,031 | 11/1971 | Kennedy | 340/572 |
| 4,792,888 | 12/1988 | Agarwal et al. | 364/188 |
| 4,803,039 | 2/1989 | Impink, Jr. et al. | 364/188 |
| 4,815,014 | 3/1989 | Lipner et al. | 364/188 |
| 5,388,945 | 2/1995 | Garric et al. | 414/217 |
| 5,469,361 | 11/1995 | Moyne | 364/468 |
| 5,583,850 | 12/1996 | Snodgrass et al. | 370/342 |
| 5,627,517 | 5/1997 | Theimer et al. | 340/572 |

Primary Examiner—Nina Tong
Attorney, Agent, or Firm—Barnes & Thornburg

[57] ABSTRACT

A method of manufacturing comprises the steps of providing a batch of articles containing one or more articles in a common step in a process of being manufactured with a machine detectable tag, providing at least one station in the manufacturing process with a detector for detecting the tag, providing a link between the at least one station and a controller, signaling detection by the detector of the presence of the tag to the controller over the link, and assigning the highest priority for processing through the at least one station to the batch.

11 Claims, 7 Drawing Sheets

MANUFACTURING METHOD AND APPARATUS

This invention relates to manufacturing methods and apparatus, and particularly to a method and apparatus for rapidly creating prototypes and small production quantities of articles which undergo a number of production process steps in the process of being manufactured.

A study was conducted to determine where time is consumed in the process of manufacturing articles which require relatively large numbers of process steps to manufacture. One of the conclusions of the study was that the processes of manufacturing such articles are characterized by, among other attributes, relatively long periods of time during which the unfinished articles just sit at various points in the manufacturing process, waiting to have the next manufacturing process step performed on them. Thus, the study authors concluded, an article, such as, for example, a printed circuit board with devices and components assembled and connected into the printed circuit generated on it that might require four to six weeks to manufacture actually is only having manufacturing operations conducted on it during twenty-four to thirty hours or so of that four to six week time period.

For large volume production, this presents no problem once an inventory of work in progress is built up at each stage in the manufacturing process. For example, in an automobile manufacturing plant, once inventories of subassemblies are built up at each stage in the manufacturing process, a completed automobile comes off the end of the assembly line every several seconds. However, in, for example, the specialty electronics manufacturing business and the electronic circuit prototyping business, where it is not uncommon to manufacture fewer than ten circuits, and sometimes as few as one circuit, requiring sophisticated manufacturing processes to be conducted in a particular order and after established dwell times in some one or more process steps, such as, for example, metal plating and etching, such manufacture fairly typically takes the above mentioned four to six weeks, even though manufacturing processes are actually only being conducted on the prototype(s) or small run manufactured article(s) for times ranging in the twenty-four to thirty hour time period mentioned above.

According to the invention, a batch of articles containing one or more articles in the same step in the process of being manufactured is provided with a machine detectable tag. At least one station in the manufacturing process is equipped with a detector for detecting the tag, and thus the presence of the batch which has reached the at least one station. A link is provided from the at least one station to a controller, and detection by the detector of the presence of the tag is signaled to the controller over the link. The controller provides an indication of the arrival of the tag, and its accompanying batch of articles at the at least one station. Manufacturing scheduling at the at least one station assigns the highest priority for processing through the at least one station to the batch.

Illustratively, there are multiple tags and respective multiple batches and manufacturing scheduling at the at least one station assigns the highest priority for processing through the at least one station in the order of the receipt of such multiple tags and their respective multiple batches at the least one station.

Illustratively, each such tag contains a unique identifier so that, once such a tag is assigned to a particular batch, that tag uniquely identifies that batch until that tag is relieved of that assignment, for example, when manufacturing operations on the articles of that batch are completed and that tag is assigned to another batch.

Illustratively, this tag is provided no later than contemporaneously with the completion of the first manufacturing process step in the process of manufacturing the batch.

Further illustratively, the controller includes a clock for keeping track of the time between when the batch arrives at the at least one station and the time when the batch arrives at the next station equipped with such a detector.

Illustratively, each station of the manufacturing process after the at least one station is equipped with such a detector.

Illustratively, the controller comprises a minicomputer or microcomputer, such as a PC.

Illustratively, the link comprises a telephone system, such as a private branch exchange (PBX) or the like.

Illustratively, the controller, the link and the station collectively comprise means for providing voice communication over the telephone system to each station.

Illustratively, each such indication can include a visual indication, observable by passersby, of the presence of a tag at the station. Illustratively, the visual indication comprises a lighted lamp.

The invention may best be understood by referring to the following detailed description and accompanying drawings which illustrate the invention. In the drawings.

The following descriptions identify specific integrated circuits and other components and in many cases specific sources for these. Specific terminal and pin names and numbers are generally given in connection with these descriptions for completeness. It is to be understood that these terminal and pin identifications are given for the specifically identified circuit components. It is further to be understood that these identifications do not constitute a representation, and no such representation should be inferred, that the specifically identified components are the only components available from the same or any other sources capable of performing the described functions. It is further to be understood that other suitable components available from the same or different sources may not use the same terminal/pin identifiers as those provided in this description.

Figure 1:
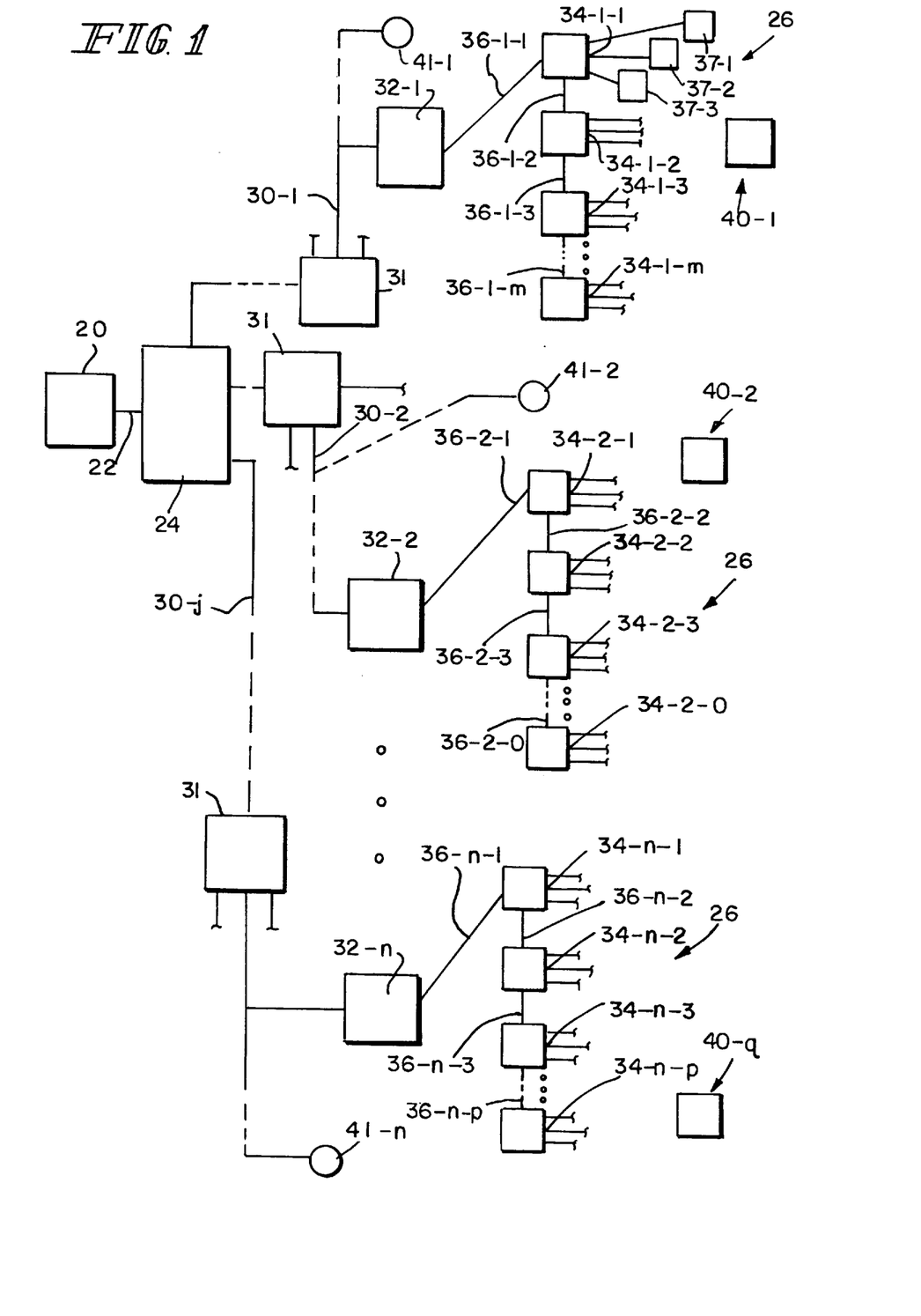
FIG. 1 illustrates a block diagram of a system constructed according to the invention.

Turning now to FIG. 1, a process controller 20, such as an appropriately programmed personal computer or minicomputer, is coupled through a data link 22 to a communication hub 24 such as, for example, a Comdial DXP telephone switch equipped with the Enterprise operating system. If a telephone switch is used as the communication hub 24, data link 22 comprises an ordinary telephone line capable of carrying voice and serial data. A significant benefit of using such a switch as the communication hub 24 is that such switches and their associated telephone lines which can also serve as data links typically already exist in most manufacturing facilities. Additionally, most of such modern switches already have the flexibility to handle data communication back and forth across them, or are upgradable to handle such data communication. Further, such switches also inherently have the capacity to handle voice communication between, for example, the controller 20 location and remote manufacturing stations 26 where the various processes are performed on batches of articles in the process of being manufactured to turn the articles in such batches into finished articles of manufacture.

Communication hub 24 is coupled by data links 30-1, 30-2, . . . 30-j to a number, n, of remote process control stations 32-1, 32-2, . . . 32-n, each of which is located at an arbitrarily critical step 26 in the manufacturing process being controlled. For example, a station 32-1, 32-2, . . . 32-n could be located at each step 26 in the manufacturing process where, for example, circuit board etching, circuit board stuffing, wave soldering, and so on, is to be performed on the articles in the batch. In another example, certain arbitrarily critical steps 26 of the manufacturing process could be selected, and one of stations 32-1, 32-2, . . . 32-n located at each such critical step. A number of remote receivers 34-1-1, 34-1-2, . . . 34-1-m; 34-2-1, 34-2-2, . . . 34-2-o; . . . 34-n-1, 34-n-2, . . . 34-n-p, respectively, are coupled by "daisy chaining" them through links 36-1-1, 36-1-2, . . . 36-1-m; 36-2-1, 36-2-2, . . . 36-2-o; . . . 36-n-1, 36-n-2, . . . 36-n-p, to respective stations 32-1, 32-2, . . . 32-n. Each link 30-1, 30-2, . . . 30-j can include multiple parallel connectors 31 for convenience in connecting multiple stations 321, 32-2, . . . 32-n via the link 30-1, 30-2, . . . 30-n to the hub 24.

The remote receivers 34-1-1, 34-1-2, . . . 34-1-m; 34-2-1, 34-2-2, . . . 34-2-o; . . . 34-n-1, 34-n-2, . . . 34-n-p are arrayed at their respective process steps 26 in such a manner as to maximize the likelihood of detecting a tag 40-1, 40-2, . . . 40-q when such a tag is placed in proximity to any one or more of receivers 34-1-1, 34-1-2, . . . 34-1-m, 34-2-1, 34-2-2, . . . 34-2-o, . . . 34-n-1, 34-n-2, . . . 34-n-p. The presence of the tag 40-1, 40-2, . . . 40-q is sensed by the receiver 34-1-1, 34-1-2, . . . 34-1-m, 34-2-1, 34-2-2, . . . 34-2-o, . . . 34-n-1, 34-n-2, . . . 34-n-p and an indication of the sensed location of the tag 40-1, 40-2, . . . 40-q is returned to the process controller 20 through the communication hub 24. Each tag 40-1, 40-2, . . . 40-q carries a unique identifier, such as a multiple bit binary code, which is associated by the process controller 20 with a particular batch of articles in the process of being manufactured at the time that tag 40-1, 40-2, . . . 40-q is assigned to that particular batch of articles in the process of being manufactured.

The process controller 20 is thus able to determine at any time where in the manufacturing process the various batches of articles being manufactured are, and is able to provide, for example, a voice link to, for example, a production supervisor, at a particular step 26 in the manufacturing facility, for example, where a station 32-1, 32-2, . . . 32-n is located. The process controller 20 can also be provided with the capability to activate, for example, a visual indicator, such as, for example, a lamp 41-1, 41-2, . . . 41-n, at the station 32-1, 32-2, . . . 32-n in the manufacturing facility where such a batch of articles in the process of being manufactured is. The process controller 20 can also be provided with the capability to time the dwelling of a batch of articles in the process of being manufactured between, for example, arrival at a station 32-1, 32-2, . . . 32-n and arrival at the next subsequent station 32-1, 32-2, . . . 32-n. In this way, audits of the lengths of time required to conduct the various manufacturing process steps 26 on the various batches of articles can be conducted quite conveniently.

The tags 40-1, 40-2, . . . 40-q, stations 32-1, 32-2, . . . 32-n, and receivers 34-1-1, 34-1-2, . . . 34-1-m, 34-2-1, 34-2-2, . . . 34-2-o, . . . 34-n-1, 34-n-2, . . . 34-n-p can be any types suitable to the manufacturing facility in which they are to be used. Examples of types suitable to various different kinds of facilities include, but are not limited to, infrared (IR), radio frequency(RF), ultrasonic, magnetic, touch-sensitive, and so on. An illustrative, but by no means limiting, example, IR, will now be described with reference to FIGS. 2, 3a–b and 4a–c. An illustrative tag 40, an IR transmitter, includes a 3 volt battery, the positive terminal of which is designated in FIG. 2 as +V and the negative terminal of which is designated as –V. The series combination of a 1 KΩ resistor 46 and the parallel combination of two 1000 μF, 6.3 V capacitors 48-1 and 48-2 is coupled across +V and –V. The anodes of two IR light emitting diodes(LEDs) 50-1 and 50-2 are coupled to the junction of resistor 46 and capacitors 48. The cathodes of LEDs 50 are coupled to the drain of a field effect transistor(FET) 52. FET 52 illustratively is a type MMFT3055EL FET. The source of FET 52 is coupled through a 1.3Ω resistor 54 to –V. The gate of FET 52 is coupled through a 1 KΩ resistor to an output terminal, pin 19, of a programmable controller IC 60, such as a Microchip type PIC16C54 controller. This controller controls the tag 40.

Figure 2:
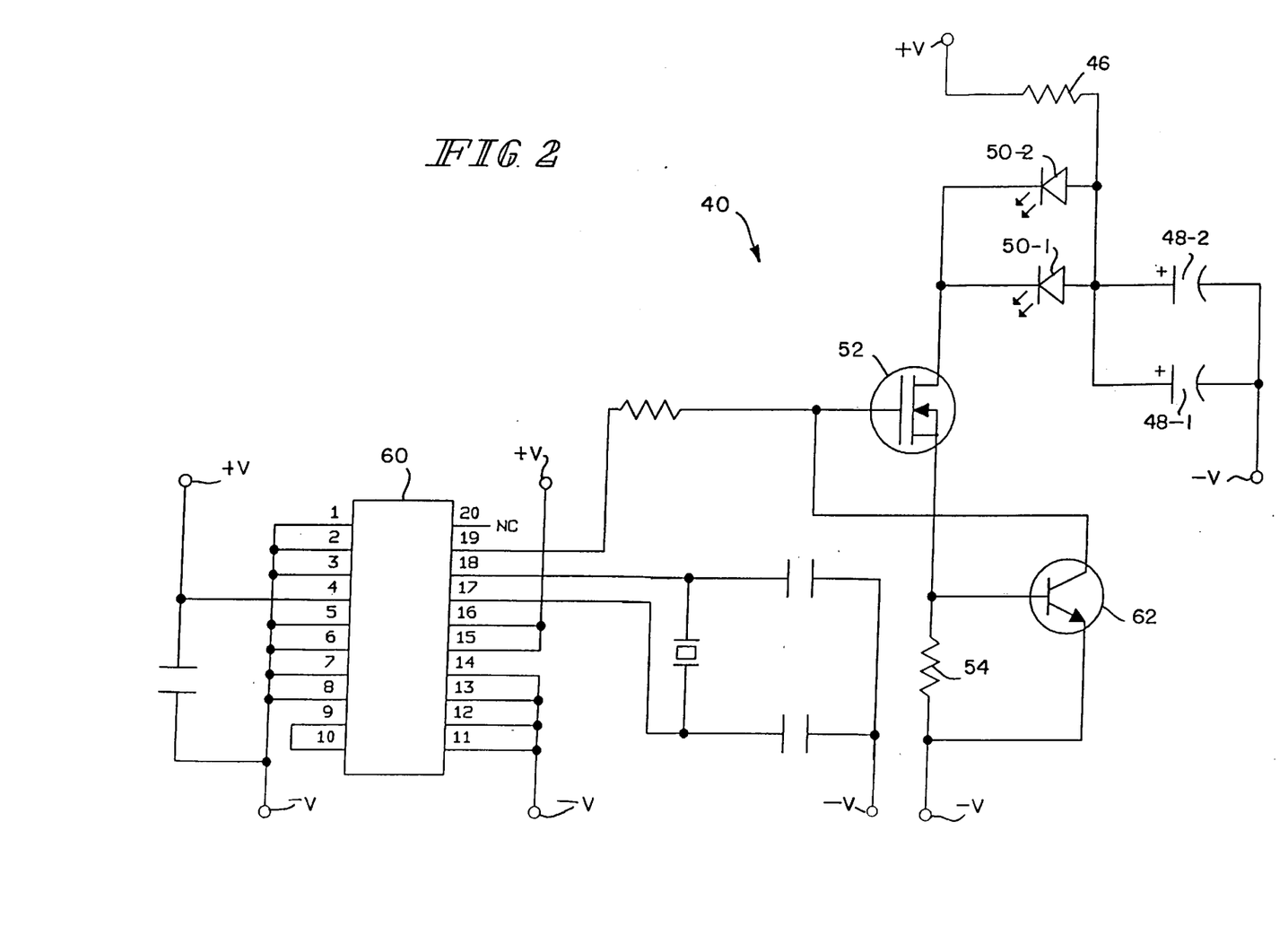
FIG. 2 illustrates a partly block and partly schematic diagram of a detail of the system illustrated in FIG. 1.

Each tag 40's IC 60 is programmed with a unique code to transmit to FET 52. This unique code is transmitted by tag 40 as an IR pulse train by LEDs 50. Feedback is provided between the source and gate of FET 52 by a bipolar transistor 62, the collector of which is coupled to the gate of FET 52, the emitter of which is coupled to –V, and the base of which is coupled to the source of FET 52. Transistor 62 illustratively is a type MMBT2222LT1 NPN transistor. The clock for IC 60 is provided by a 2 MHz crystal coupled across pins 17 and 18 of IC 60. These terminals are also coupled to –V through 33 μF, 50 V capacitors. The code programmed into each tag 40-1, 40-2, . . . 40-q is unique. When a particular tag 40 is assigned to a particular batch of articles to be manufactured, the unique code with which that tag 40 is programmed is entered into the process controller 20 and is henceforth identified in the process controller 20 with that batch of articles. When processing of that batch of articles is completed, that tag 40 is returned to the inventory of tags 40 ready to be reassigned physically, and in the process controller 20, to subsequent batches of articles to be processed.

Figure 3A:
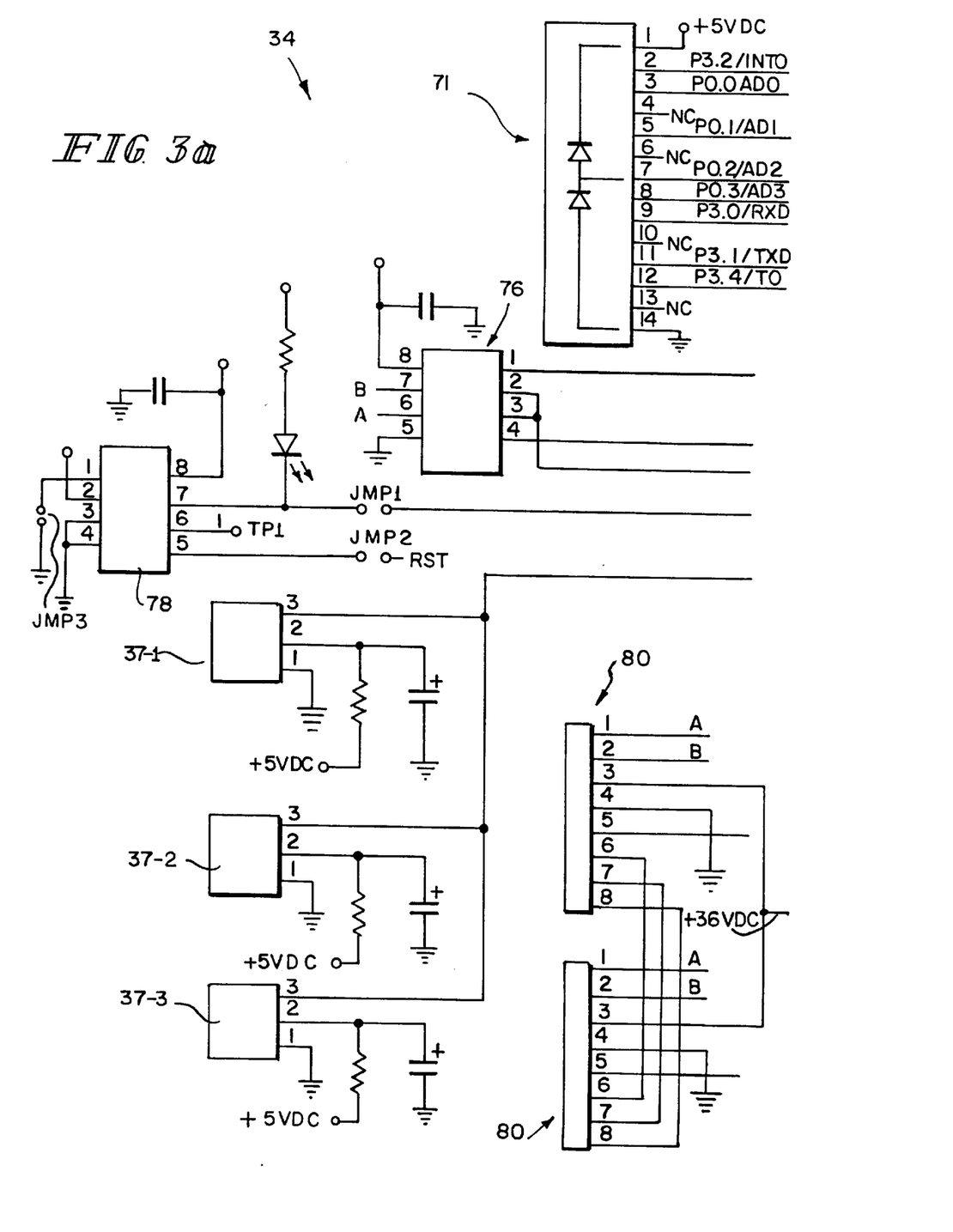
FIGS. 3a–3b illustrate a partly block and partly schematic diagram of another detail of the system illustrated in FIG. 1.
Figure 3B:
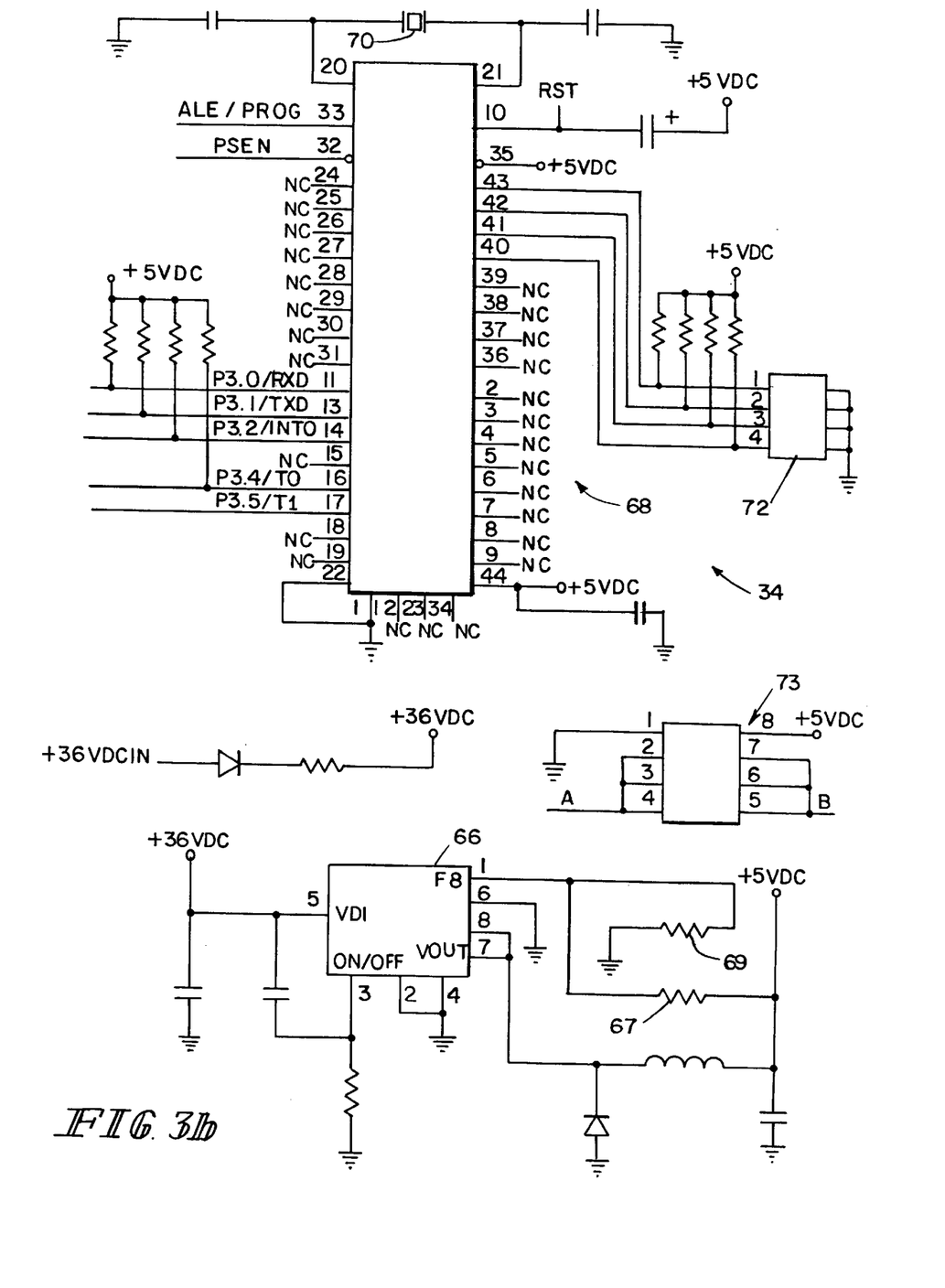

An illustrative receiver 34 suitable for use with the IR transmitter tag 40 illustrated in FIG. 2 will now be described with reference to FIGS. 3a–b. Power for receiver 34 in the illustrated embodiment is supplied through the data link 30 which, in the illustrative embodiment, comprises a telephone line and a connector 31 of the type illustrated in FIGS. 1 and 4a, from the hub 24. In the illustrative embodiment, the power source is +36 VDC. This voltage is coupled via the telephone line and connector 31 to input terminal VIN(pin 5) of a +5 VDC(hereinafter +V) regulator 66. Regulator 66 illustratively comprises a National Semiconductor type LM2574HVN-ADJ programmable +V regulator. Regulator 66 is programmed by the ratio of resistors 67 and 69 coupled across its output terminal, pin 7, and ground. The common terminal of resistors 67 and 69 is coupled to the FeedBack terminal, pin 1, of regulator 66. In the illustrated embodiment, resistors 67 and 69 are 3.09 KΩ and 1 KΩ resistors, respectively. +V is provided at the VOUT terminal, pin 7, of regulator 66.

Pin 5 of regulator 66 is coupled through a 100 μF, 50 VDC capacitor to ground and through a 0.33 μF, 50 V capacitor to the ON/OFF terminal, pin 3 of regulator 66. A 47 KΩ resistor is coupled between pin 3 of regulator 66 and ground. Pins 7 and 8 of regulator 66 are coupled through a 470 μH choke to resistor 67. A 470 μF, 10 V capacitor is coupled between the common terminal of resistor 67 and the choke and ground. A flyback diode is coupled between pins 7 and 8 of regulator 66 and ground. +V is coupled to a power supply input terminal, pin 44, of a microprocessor (μP) 68 which illustratively is an Intel type N80C52-20-R8245, 8052 μP. The clock for μP 68 comprises an 18.432 MHz crystal 70 coupled across pins 20, 21 of μP 68. Transient protection for various terminals of μP 68 and for the A and B lines of the RS-485 interface is provided by, for example, a Motorola MMAD 1103 IC 71 and a Motorola TCF 6000 IC 73. IR receivers 37-1, 37-2 and 37-3 are coupled to an input terminal P3.2/INTO, pin 14, of μP 68. IR receivers 37-1, 37-2 and 37-3 illustratively are a Siemens type SFH505A IR sensor.

The +V supply is coupled through a 330Ω resistor to pin 2 of each of IR receivers 37-1, 37-2 and 37-3. Pins 2 of IR receivers 37-1, 37-2 and 37-3 are also coupled through 4.7 μF, 16V capacitors to ground. μP 68 itself has a programmable address, so that communication hub 24 and process controller 20 will be able to identify which receiver 32-1-1, 32-1-2, . . . 32-n-p is reporting the presence of a particular tag 40-1, 40-2, . . . 40-q and its associated batch of articles. This addressing is achieved through a quad switch 72. One contact of each of the single pole, single throw switches in quad switch 72 is coupled to ground. The other contact of each such switch is coupled to a respective input terminal P0.0/AD0, P0.1/AD1, P0.2/AD2, P0.3/AD3, pins 43-40, respectively, of μP 68. Each of these pins is also coupled through a respective 10 KΩ pull-up resistor to +V. The states of the switches in quad switch 72 thus determine the address of receiver 34. That address is sent over data link 30 along with the information indicating the presence and identity of a particular tag 40 at that receiver 34.

μP 68 communicates with process controller 20 via connector 31, data link 30, communication hub 24 and data link 22 by means including an RS-485 interface 76. The interface provides connections to lines A and B, the RS-485 signal lines. Interface 76 illustratively is a National Semiconductor type DS3695 RS-485 line driver. Lines A and B are coupled respectively to pins 6 and 7 of interface 76. Pin 1 of interface 76 is coupled to the P3.0/RXD input terminal, pin 11, of μP 68. Pins 2 and 3 of interface 76 are coupled to terminal P3.4/T0, pin 16, of μP 68. Pin 4 of interface 76 is coupled to output terminal P3.1/TXD, pin 13, of μP 68. Pins 11,13,14 and 16 of μP 68 are coupled through respective 10 KΩ pull-up resistors to +V. A so-called "watchdog" circuit 78 monitors the activity of the μP 68. Watchdog circuit 78 illustratively comprises a Linear Technology type LTC1232 integrated circuit. +V is coupled through a 470Ω resistor and an LED to pin 7 of watchdog IC 78 and to terminal 3.5/T1 of μP 68. If μP 68 does not produce any activity on this line about every half second or so, watchdog IC 78 sends a ReSeT signal from pin 5 of watchdog circuit 78 to pin 10 of μP 68, reinitializing μP 68.

Figure 4A:
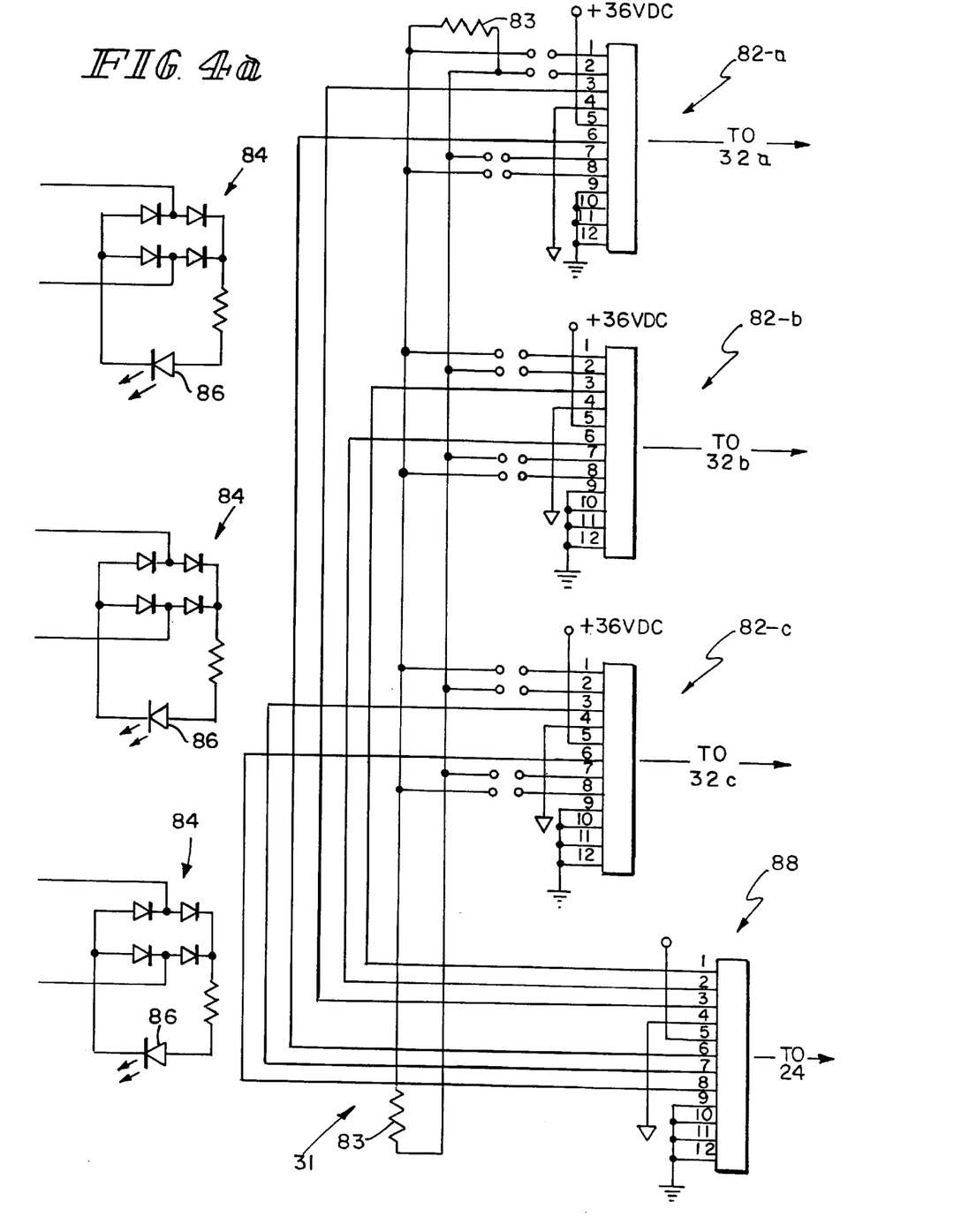
FIGS. 4a–4c illustrate a partly block and partly schematic diagram of another detail of the system illustrated in FIG. 1.
Figure 4B:
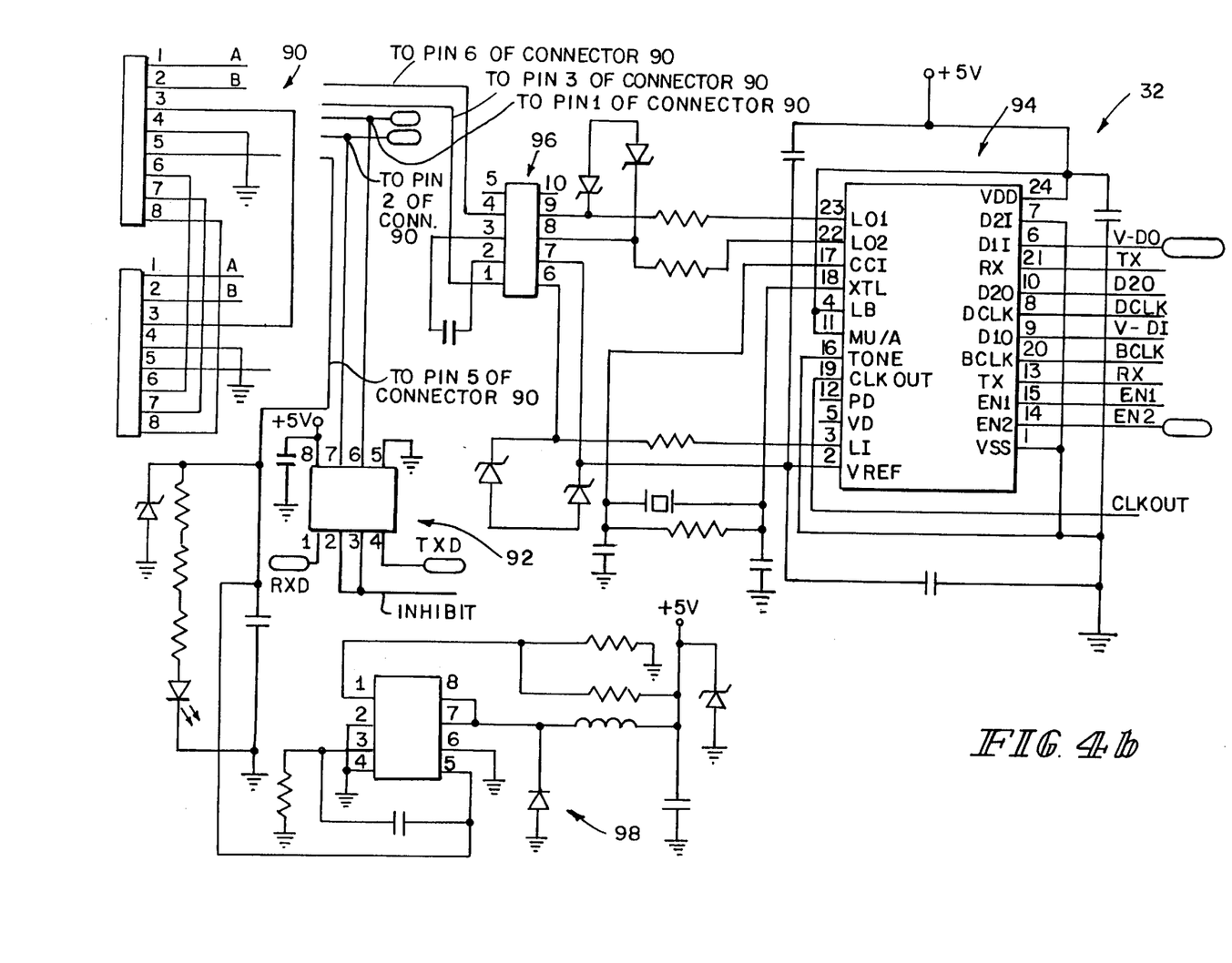
Figure 4C:
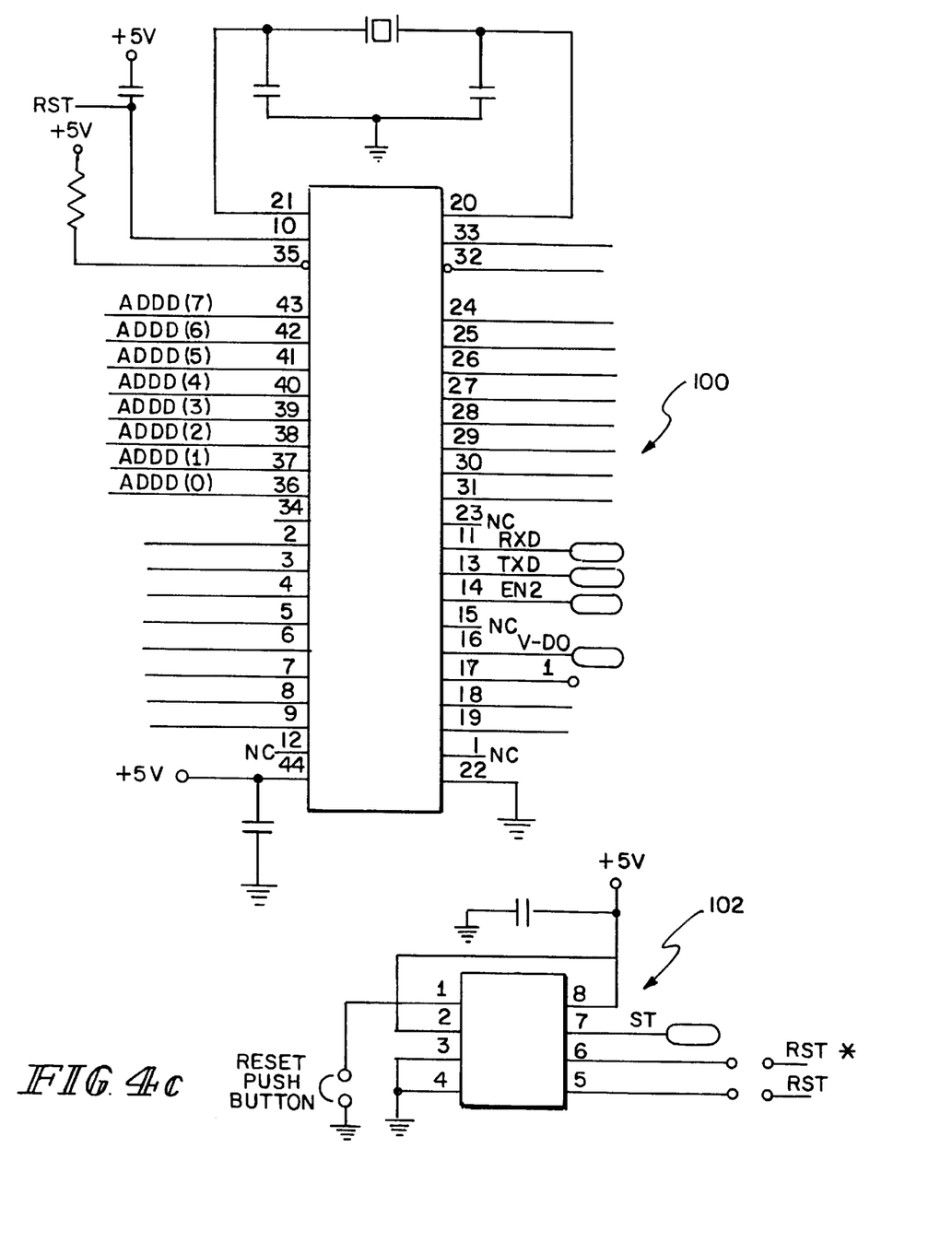

Receivers 34 can be "daisy chained" together via sockets 80 and cables(not shown) having plugs configured complementarily to the sockets 80. In order that larger numbers of receivers 34 can be coupled into the system, the data links 30 may comprise more than simply multiple conductor cables. In the illustrated embodiment, for example, certain impedance matching and protocol conversion functions must be performed to permit the receivers 34 to communicate with the Comdial DXP communication hub 24. Referring to FIGS. 4a–c, an interface which accomplishes these objectives will be described. Cables from various receivers 34 connect the receivers 34 to complementary sockets 82 on the interface. Sockets 82 are equipped with circuits 84 containing LEDs 86 which provide visual indications of activity on their respective sockets 82. Each circuit 84 includes a full-wave rectifier and a 3.5 KΩ, 1½ W resistor in series with its respective LED 86. Two parallel 120Ω resistors 83 are coupled across the A and B lines. A socket 82 is coupled by a cable(not shown) having connectors complementarily configured to socket 82 to a connector 90. Pins 1 and 2 of connector 90 correspond to pins 1 and 2 of sockets 82. That is, they are the A and B lines of the RS-485 interface. As such, they are connected to pins 6 and 7 of an RS-485 interface IC 92. As discussed above in connection with FIGS. 3a–b, a National Semiconductor type 3695 IC is a suitable circuit for this purpose. Pins 4 and 5 of connector 90 correspond to pins 4 and 5 of sockets 82. That is, the +36 V supply provided by the communication hub 24, the Comdial DXP switch in this embodiment, appears across pins 4 and 5.

Communication to and from the communication hub 24 flows through socket 88 of connector 31, which is connected via data link 30 to hub 24, and through a respective one of sockets 82, which are connected to their respective connectors 90, to pins 3 and 6 of connector 90. That communication is effected through two universal digital loop transceivers (UDLTs), one(not shown) in the communication hub 24 and one 94 in the station 32. The UDLT in the communication hub is referred to as the master UDLT. The UDLT 94 in the station 32 is referred to as the slave UDLT. The slave UDLT 94 is coupled to pins 3 and 6 of connector 90 through an isolation transformer 96 capable of data transmission. Data transmissions from the slave UDLT 94 to the master UDLT appear across terminals L01 and L02, pins 23 and 22, respectively, of slave UDLT 94. Data transmissions to the slave UDLT 94 from the master UDLT appear across terminals LI and VREF, pins 3 and 2, respectively, of slave UDLT 94. Pins 22 and 23 of slave UDLT 94 are coupled through series 220Ω resistors to their respective terminals of transformer 96. Back to back 5.6 V Zener diodes are coupled across these terminals of transformer 96 for transient protection. Pin 3 of slave UDLT 94 is coupled through a series 220Ω resistor to its respective terminal of transformer 96. Back to back 5.6 V Zener diodes are coupled across these terminals of transformer 96 for transient protection. The clock for slave UDLT 94 is provided by a 8.192 MHz crystal coupled across terminals XTL and CCI of slave UDLT 94. Power for slave UDLT 94 and its associated circuitry is provided by a power supply 98 of the same general configuration as regulator 66 and its associated circuitry in FIG. 3b. The +V supplied by power supply 98 is coupled to the VDD terminal, pin 24, of UDLT 94, as well as to terminals LB and MU/A, pins 4 and 11, respectively, thereof +V is divided in half by a capacitive voltage divider comprising series 0.1 μF, 50 V capacitors, and +2.5 V(+V/2) is coupled to the VREF terminal of UDLT 94.

Control of UDLT 94 is achieved by a μP 100, which illustratively is a type 80C52-20-R8245, 8052 μP. The μP 100 can be coupled directly to the UDLT 94, or coupled to it through a latch, or coupled to it through a port-expanding, application-specific integrated circuit(ASIC), or coupled to it through some other suitable means. In the present case, the μP 100 controls the UDLT 94 through an ASIC(not shown) which time division multiplexes several different inputs to the UDLT 94 because other functions, such as, for example, voice communication, are to be provided through the master and slave UDLTs. In any event, the ADDD(7)–ADDD(0) terminals, pins 36–43, respectively, of μP 100 are coupled to terminals RX, D2O, DCLK, D1O, BCLK, TX, EN1 and CLK OUT, pins 21, 10, 8, 9 20, 13, 15 and 19, respectively, of UDLT 94. Pins 16 and 14 of μP 100 are also coupled to the D1I and EN2 terminals, pins 6 and 14, respectively, of UDLT 94. The clock for μP 100 is provided by an 18.432 MHz crystal coupled across pins 20 and 21 of μP 100. The ReSeT terminal of a watchdog circuit 102 of the same general configuration as, for example, circuit 78 described in connection with FIGS. 3*a*–*b* is coupled to pin 10 of μP 100.

What is claimed is:

1. A method of manufacturing comprising steps of providing a batch of articles containing at least one article in a step in a process of being manufactured with a machine detectable tag, providing at least one station in the manufacturing process with a detector for detecting the tag, providing a link between the at least one station and a controller, signaling detection by the detector of the presence of the tag to the controller over the link, and assigning a highest priority for processing through the at least one station to the batch.

2. The method of claim 1 wherein the step of providing a batch of articles containing at least one article with a machine detectable tag comprises steps of providing multiple machine detectable tags and respective multiple batches.

3. The method of claim 1 or 2 wherein the step of assigning the highest priority for processing through the at least one station to the multiple batches comprises assigning the highest priority for processing through the at least one station in the order of the receipt of said multiple tags and their respective multiple batches at the at least one station.

4. The method of claim 2 comprising a step of providing each tag with a unique identifier so that said each tag uniquely identifies a batch to which said each tag is assigned until said each tag is no longer assigned to its respective said batch.

5. The method of claim 4 wherein the step of providing each batch with a machine detectable tag comprises providing said each batch with a machine detectable tag no later than contemporaneously with the completion of a first manufacturing process step in the process of manufacturing said each batch.

6. The method of claim 1 or 2 further comprising a step of providing a station of the manufacturing process after the at least one station with a detector.

7. The method of claim 6 wherein the step of providing the link between the at least one station and the controller comprises providing the link between the at least one station and the controller including a clock, the controller keeping track of the time between when the batch arrives at the at least one station and the time when the batch arrives at a subsequent station equipped with the detector.

8. The method of claim 1 or 2 wherein the step of providing the link between the at least one station and the controller comprises providing the link between the at least one station and a computer.

9. The method of claim 1 or 2 wherein the step of providing the link between the at least one station and the controller comprises providing voice and data communication between the at least one station and the controller.

10. The method of claim 9 wherein the step of providing the link between the at least one station and the controller comprises providing a private branch exchange.

11. The method of claim 1 or 2 wherein the step of providing the link between the at least one station and the controller further comprises providing a visual indication at the at least one station of the presence of the tag at the at least one station.

* * * * *